US006723923B2

United States Patent
Tsukamoto

(10) Patent No.: US 6,723,923 B2
(45) Date of Patent: Apr. 20, 2004

(54) WIRE HARNESS SLACK ABSORBING APPARATUS

(75) Inventor: Masashi Tsukamoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/199,012

(22) Filed: Jul. 22, 2002

(65) Prior Publication Data
US 2003/0015340 A1 Jan. 23, 2003

(30) Foreign Application Priority Data
Jul. 23, 2001 (JP) ..................... P2001-220847

(51) Int. Cl.$^7$ ................................. H02G 3/00
(52) U.S. Cl. .................. 174/68.1; 174/68.3; 174/72 A; 248/68.1
(58) Field of Search ................ 174/68.1, 68.3, 174/72 A, 101, 95, 97, 72 R, 69; 248/68.1; 191/12 R, 12 S; 296/152, 146.7, 70

(56) References Cited

U.S. PATENT DOCUMENTS 5,534,665 A * 7/1996 Long ..................... 174/68.1 X
6,120,327 A * 9/2000 O'Brien et al. ....... 174/72 A X
6,380,484 B1 * 4/2002 Theis et al. ............. 174/68.3 X
6,410,844 B1 * 6/2002 Bruner et al. .......... 174/68.1 X
6,437,243 B1 * 8/2002 Vander Velde et al. .... 174/68.3

* cited by examiner

Primary Examiner—Dhiru R Patel
(74) Attorney, Agent, or Firm—Sughrue Mion, PLLC

(57) ABSTRACT

A wire harness slack absorbing that includes a slack-portion accommodating part for accommodating a slack portion (24) of a wire harness (22), which is bent to have an annular shape in a view, and to be able to freely decrease and increase the diameter thereof, and a contract restraining part (32) provided in the slack-portion accommodating part (31) having an end portion, which comes in contact with the slack portion (24) to thereby provide a distance between segments of an intersection part (45) of the slack portion (24). The contact restraining portion (32) has elasticity. An end part of the contact restraining portion (32) has a groove (42) for preventing a contact part from slipping from the slack portion (24). The contact restraining portion (32) has a slope (43) provided between an end portion thereof and a base portion opposite to the end portion.

20 Claims, 5 Drawing Sheets

WIRE HARNESS SLACK ABSORBING APPARATUS

BACKGROUND OF THE INVENTION

The present invention relates to a wire harness slack absorbing apparatus for wiring a wire harness between a main body and a moving body so that the wire harness has at least slack needed for moving the moving body.

For example, in the case of a wire harness wired in a steering column, it is necessary for responding to operations of a tilting mechanism and a telescopic mechanism of the steering column that the wire harness is enabled to absorb the expansion and contraction of the wire harness, which are caused by operations of the mechanisms. A conventional wire harness slack absorbing apparatus provided against such a background, as illustrated in FIG. 7, is known as an apparatus having the function of absorbing the expansion and contraction of the wire harness (that is, absorbing slack in the wire harness).

As shown in FIG. 7, the wire harness slack absorbing apparatus 1 is configured in such a way as to comprise a harness case 2 and a harness cover 3. The harness case 2 and the harness cover 3 are adapted so that a slack portion 6 in a middle part of the wire harness 5 drawn out of a steering 4 can be accommodated therein in a state in which the slack portion 6 is bent in such away as to have an annular shape in a plan view. In this figure, reference numeral 7 designates a slack-portion accommodating part 7 for accommodating the slack portion 6. Reference numeral 8 denotes an outlet for the slack portion 6. Reference numeral 9 designates a rigid wire portion, which a rigid cylinder 10 is provided along and fixed to.

Meanwhile, the conventional apparatus has a problem that when the steering 4 is adjusted, the slack portion 6 is drawn out of the outlet 8 and at that time, an intersection part 11 of the slack portion 6 illustrated in FIGS. 8A and 8B rubs itself to thereby lower the durability of the wire harness 5. Moreover, the conventional apparatus has another problem that when the slack portion 6 having been drawn out of the outlet 8 is drawn into the slack-portion accommodating part 7, the intersection part 11 is caught therein and thus, the wire harness cannot be smoothly drawn thereinto.

Furthermore, reference numeral 12 denotes a fixed-end-side part of the slack portion 6. The conventional apparatus has other problems that members (not shown), such as tapes, bands, and clips, are needed for fixing the part 12 to the harness case 2 or the harness cover 3, and that thus, increase in the number of components and in the number of man-hours occurs and affects the cost of the apparatus.

SUMMARY OF THE INVENTION

The invention is accomplished in view of the aforementioned circumstances. Accordingly, an object of the invention is to provide a wire harness slack absorbing apparatus, which is enabled to enhance the durability thereof and to achieve smooth drawing-in of a wire harness and reduction in the cost thereof.

In order to solve the aforesaid object, the invention is characterized by having the following arrangement.

(1) A wire harness slack absorbing apparatus for wiring a wire harness between a main body and a moving body movably mounted on the main body so as to have at least a slack portion needed when the moving body is moved, the wire harness slack absorbing apparatus comprising:

a slack-portion accommodating part for accommodating the slack portion which is bent so as to have an annular shape in a plan view so that a diameter of the annular shape is freely increased and decreased; and a contact restraining part which is provided in the slack-portion accommodating part and includes an end portion which comes in contact with the slack portion to provide a distance between segments of an intersection part of the slack portion which is bent into the annular shape.

(2) The wire harness slack absorbing apparatus according to (1), wherein the slack portion is interposed between the end portion of the contact restraining part and an inner surface of a wall of the slack-portion accommodating part so as to hold the slack portion.

(3) The wire harness slack absorbing apparatus according to (1), wherein the contact restraining part has elasticity.

(4) The wire harness slack absorbing apparatus according to (1), wherein the end portion of the contact restraining part has a groove for preventing the slack portion from slipping therefrom.

(5) The wire harness slack absorbing apparatus according to (1), wherein the contact restraining part has a slope provided between the end portion and a base portion thereof opposite to the end portion.

(6) The wire harness slack absorbing apparatus according to (1), wherein the distance is equal to or more than a diameter of the wire harness.

BRIEF DESCRIPTION OF THE DRAWINGS

FIG. 8A is a transversally sectional view thereof at the time of drawing a slack part therefrom. FIG. 8B is a transversally sectional view thereof at the time of drawing the slack part thereinto.

DETAILED DESCRIPTION OF PREFERRED EMBODIMENTS

Hereinafter, an embodiment of the invention is described by referring to the accompanying drawings.

Figure 1:
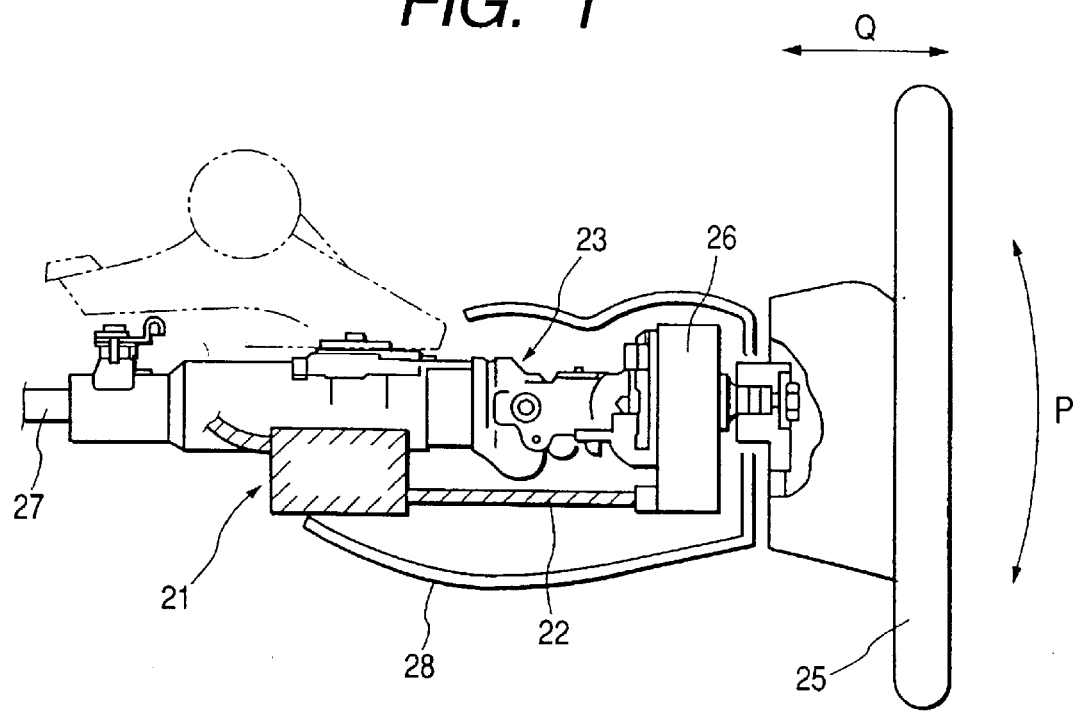
FIG. 1 is a mounting state view illustrating an embodiment of a wire harness slack absorbing apparatus according to the invention, which is mounted on a steering column.
Figure 2:
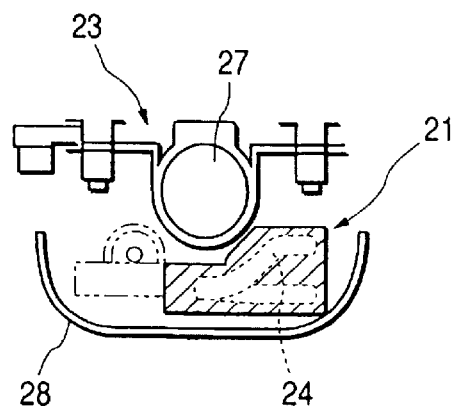
FIG. 2 is a mounting state view taken from an axial direction of a steering shaft.
Figure 3:
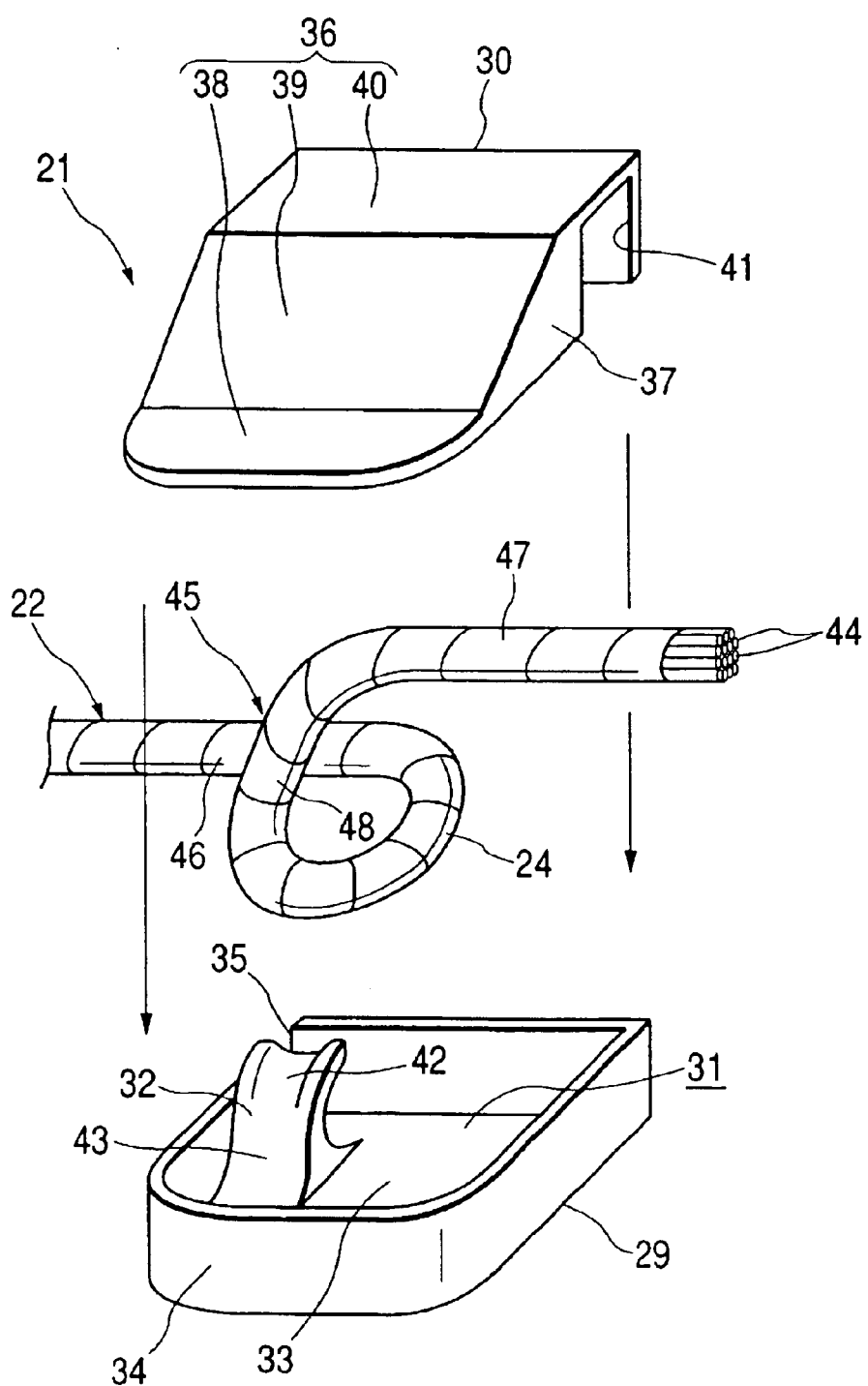
FIG. 3 is an exploded perspective view illustrating the wire harness slack absorbing apparatus.
Figure 4:
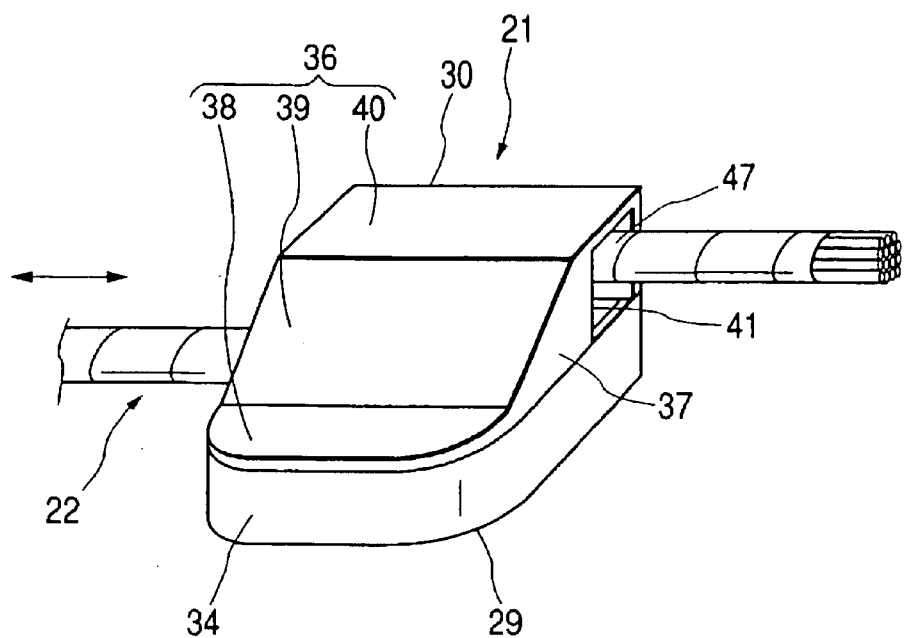
FIG. 4 is a perspective view illustrating the wire harness slack absorbing apparatus.
Figure 5:
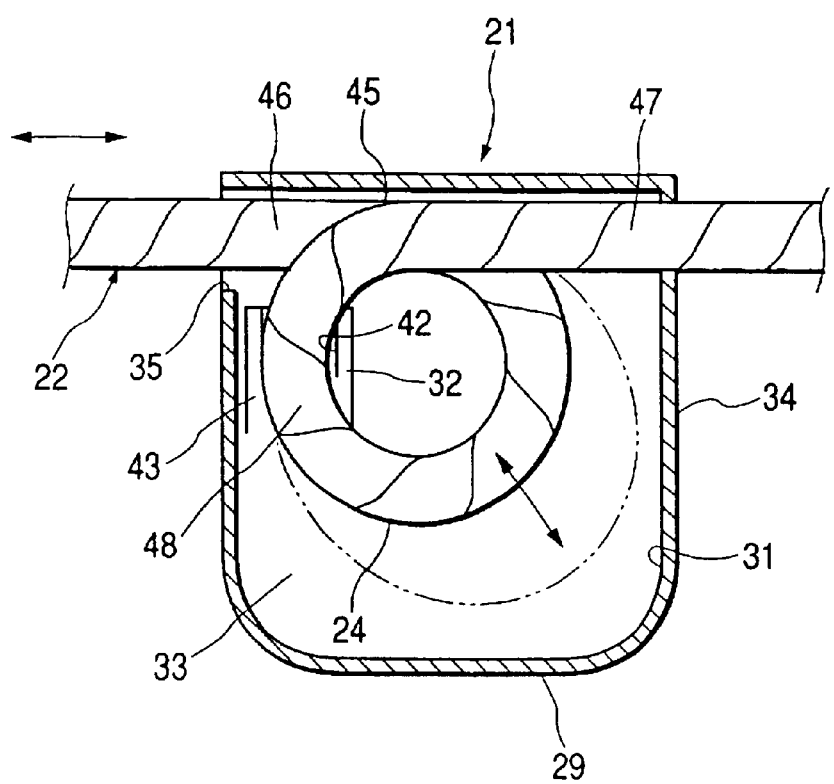
FIG. 5 is a transversally sectional view illustrating the wire harness slack absorbing apparatus.
Figure 6:
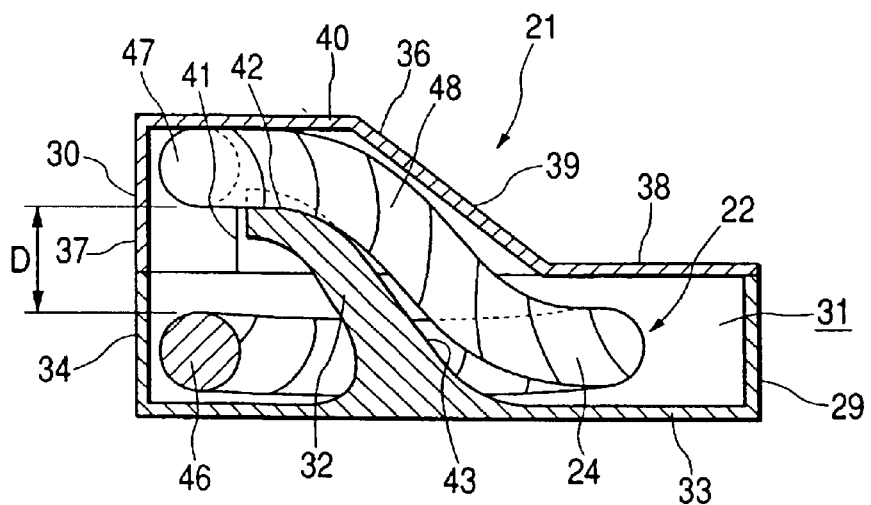
FIG. 6 is a longitudinally sectional view illustrating the wire harness slack absorbing apparatus.

FIG. 1 is amounting state view illustrating an embodiment of a wire harness slack absorbing apparatus according to the invention, which is mounted on a steering column. FIG. 2 is a mounting state view taken from an axial direction of a steering shaft. FIG. 3 is an exploded perspective view thereof. FIG. 4 is a perspective view thereof. FIG. 5 is a transversally sectional view thereof. FIG. 6 is a longitudinally sectional view thereof.

In FIG. 1, reference numeral 21 designates a wire harness slack absorbing apparatus to be mounted at a middle part of a wire harness 22. As shown in the figure, the wire harness slack absorbing apparatus 21 is attached to, for instance, a steering column 23 of a vehicle, and enabled to perform the expansion and contraction of the wire harness 22, which are caused by operations of a tilting mechanism (that is, a mechanism corresponding to an operation to be performed in the direction of an arrow P) and a telescopic mechanism (that is, a mechanism corresponding to an operation to be performed in the direction of an arrow Q). That is, the wire harness slack absorbing apparatus 21 has a structure enabled to absorb the slack portion 24 (see FIG. 3), which is needed for the expansion and contraction of the wire harness 22.

Incidentally, in the steering column 23 of FIGS. 1 and 2, reference numeral 25 designates a steering. Reference numeral 26 denotes a combination switch unit, to which a terminal of the wire harness 22 is connector-connected. Reference numeral 27 designates a steering shaft. Reference numeral 28 denotes a column cover.

As illustrated in FIGS. 3 to 6, the wire harness slack absorbing apparatus 21 is constituted by a harness case 29 and a harness cover 30. The wire harness slack absorbing apparatus 21 has a slack-portion accommodating 31 constituted therein by the harness case 29 and the harness cover 30 fitted to each other. The wire harness slack absorbing apparatus 21 has a contact restraining part 32 provided in the slack-portion accommodating part 31. The contact restraining part 32 includes an end portion 49.

The harness case 29 is constituted by a bottom wall 33 and a side wall 34 formed on a peripheral edge of the bottom wall 33. The bottom wall 33 is formed in such a way as to be flat, and has an area that is sufficient to allow the slack portion 24 to increase the diameter thereof to the maximum. An outlet 35 cut out in the direction of height of the side wall 34 at a suitable place.

The harness cover 30 is adapted to cover an opening part (that is, an opening part formed by the end portion of the side wall 34) of the harness case 29, and constituted by a ceiling wall 36, which has a step formed in the direction of the height, and a side wall 37 formed on a part of the peripheral edge of the ceiling wall 36. The ceiling wall 36 is formed in such a way as to have an area corresponding to the area of the bottom wall 33 of the harness case 29 in a plan view (taken in a direction in which FIG. 5 is taken), and includes a first flat wall 38 fitted to the side wall 34 of the harness case 29, and an inclined wall 39 continuously formed from the first flat wall 38, and a second flat wall 40 (corresponding to the wall of the second wire harness slack absorbing apparatus of the invention) continuously formed from the inclined wall 39 and disposed at a place that is higher than the position of the first flat wall 38. Incidentally, a reason for forming the ceiling wall 36 in such a way as to have such a shape is that the apparatus has the contact restraining part 32. The side wall 37 is continuously formed from the inclined wall 39 and the second flat wall 40. An outlet similar to the outlet 35 of the harness case 29 is formed at a place opposite to the outlet 35. A fitting member (not shown) for fitting the sidewall 37 into the harness case 29 is formed thereon.

The contact restraining part 32 is a member for restraining portions of the slack portions 24 from coming in contact with each other, and formed in such a way as to protrude from the bottom wall 33 of the harness case 29 in the direction of the height. The contact restraining part 32 is placed at the side of the outlet 35 of the harness case 29. The contact restraining part 32 is located and formed so that the slack portion 24 can be interposed between the projecting end (corresponding to the end portion of the first wire harness slack absorbing apparatus of the invention) of the contact restraining part 32 and (the inner surface of) the second flat wall 40 of the harness cover 30. The contact restraining part 32 has elasticity. A groove 42 for preventing the slack portion 24 from slipping from the projecting end of the contact restraining part 32 is formed in the projecting end thereof. A slope 43 is formed between the projecting end of the contact restraining part 32 and a base portion (that is, a part uprising from the bottom wall 33 of the harness case 29), which is opposite to the projecting end thereof, in such a way as to have an appropriate angle of inclination. Incidentally, the groove 42 and the slope 43 are assumed to be arbitrarily set. Similarly, the aforementioned elasticity is arbitrarily set.

Incidentally, the harness case 29, the harness cover 30, and the contact restraining part 32 are assumed to be permitted to be made of either of a synthetic resin and a metal. In the case that such constituent elements are made of a synthetic resin, the contact restraining part 32 can be integrally formed. In the case that such constituent elements are made of a metal, it is sufficient that the contact restraining part 32 is fixed by appropriate fixing means, such as welding means.

On the other hand, the wire harness 22 is a bundle of plural electric wires 44 bundled by tape-winding. The wiring of the wire harness 22 is performed in such a way as to be prevented, as much as possible, from slacking. The slack portion 24 provided in the middle part of the wire harness 22 has a length that has at least a value needed for operations of the aforementioned mechanisms. The slack portion 24 is accommodated in the slack-portion accommodating part 31 by being bent in such a way as to have an annular shape in a plan view (see FIG. 5), and to be able to freely decrease and increase the diameter thereof. Reference numeral 45 designates an intersection part of the slack portion 24. The contact restraining portion 32 provides a distance D between segments of the intersection part 45. Preferably, the distance D is equal to or more than the diameter of the wire harness 22.

With the aforementioned configuration, the wire harness slack absorbing apparatus 21 is attached to the steering column 23 by appropriate fixing means during a state that the slack portion 24 is accommodated in the slack-portion accommodating part 31 by being bent in such a way as to have an annular shape in a plan view. At that time, the slack portion 24 accommodated in the slack-portion accommodating part 31 is brought into a state that an end part 46 of the slack portion 24, which part serves as a moving side part of the wire harness 22, is drawn out of the outlet 35, and the other end part 47 of the slack portion 24, which part serves as a fixed end part, is drawn out of the outlet 41. The other end part 47 (or the middle part) of the slack portion 24 is interposed between the projecting end of the contact restraining part 32 and the second flat wall 40 of the harness cover 30, so that the position state of the end part 47 is held (that is, a tensile force is not transmitted to the fixed end part). An inclined part 48 of the slack portion 24, which is formed by providing the distance D therebetween, is disposed along the slope 43.

As illustrated in FIG. 5, the wire harness slack absorbing apparatus 21 performs the following operations. That is, the moving end part of the wire harness 22 is pulled in response to the operation of each of the mechanisms. When one 46 of the end parts of the slack portion 24 is drawn out of the outlet 35, the slack portion 24 bent in such a manner as to have an annular shape in a plan view is drawn out from the slack-portion accommodating part 31 by a length, which is within a range of the length of the slack portion 24, by simultaneously decreasing the diameter thereof within the slack portion accommodating part 31. Conversely, when the operation of each of the mechanisms finishes and the apparatus returns to an original state, the drawn end part 46 of the slack portion 24 is drawn into the slack-portion accommodating part 31. At that time, the slack portion 24 returns to the original state in the slack-portion accommodating part 31 by simultaneously increasing the diameter thereof. In the slack-portion accommodating part 31, the contact restraining part 32 is provided, so as to provide the distance D between segments of the intersection part 45 of the slack portion 24 when the slack portion 24 is drawn out therefrom and drawn thereinto. Thus, the intersection part 45 of the slack portion 24 can be prevented from being abraded and caught therein.

As described above, the intersection part 45 of the slack portion 24 is prevented from being abraded and caught therein, so that the durability of the wire harness 22 is enhanced, and that the drawing-out and drawing-in of the wire harness 22 can be smoothly performed. Moreover, the position state of the other end part 47 of the slack portion 24, with which the projecting end of the contact restraining part 32 comes in contact, can be held by the contact restraining part 32 and the second flat wall 40. Consequently, as compared with the case of the conventional apparatus, the number of components and that of man-hours can be decreased, so that the cost of the apparatus can be reduced. Furthermore, because the contact restraining part 32 has elasticity, the sandwiched end part 47 of the slack portion 24 can be held without applying excessive side pressure thereto. Further, the sandwiched end part 47 of the slack portion 24 can be prevented by the groove 42 of the contact restraining part 32 from slipping therefrom. Thus, the distance D can be reliably caused between segments of the intersection part 45 of the slack portion 24. Consequently, the durability of the wire harness 22 can be enhanced still more. Further, the slack portion 24 can be prevented by the slope 43 of the contact restraining part 32 from slacking. Consequently, the intersection part of the slack portion can be more reliably prevented from being abraded and caught in the accommodating part.

Incidentally, the wire harness slack absorbing apparatus 21 has the step provided in the harness cover 30 thereof. Thus, as illustrated in FIG. 2, the mounting of the apparatus 21 and the absorption of the slack 24 can be performed by effectively utilizing a space provided around the steering shaft 27.

Additionally, needless to say, various modifications can be made without departing from the gist of the invention. That is, the other end part 47 of the slack portion 24 can be moved by inhibiting the projecting end of the contact restraining part 32 from putting the end part 47 into between the projecting end and the second flat wall. This is effective in the case that moving bodies are provided on both sides of the main body.

Incidentally, elements respectively corresponding to the main body and the moving body of the first wire harness slack absorbing apparatus of the invention are not limited to the aforementioned steering column 23. Such elements may be a car main body and doors (that is, opening/closing bodies) of a vehicle, a vehicle main body and seats (limited to slidable ones) of a car, or an instrument panel and audio units (or an air-conditioner unit or a meter unit) of a vehicle.

Figure 7:
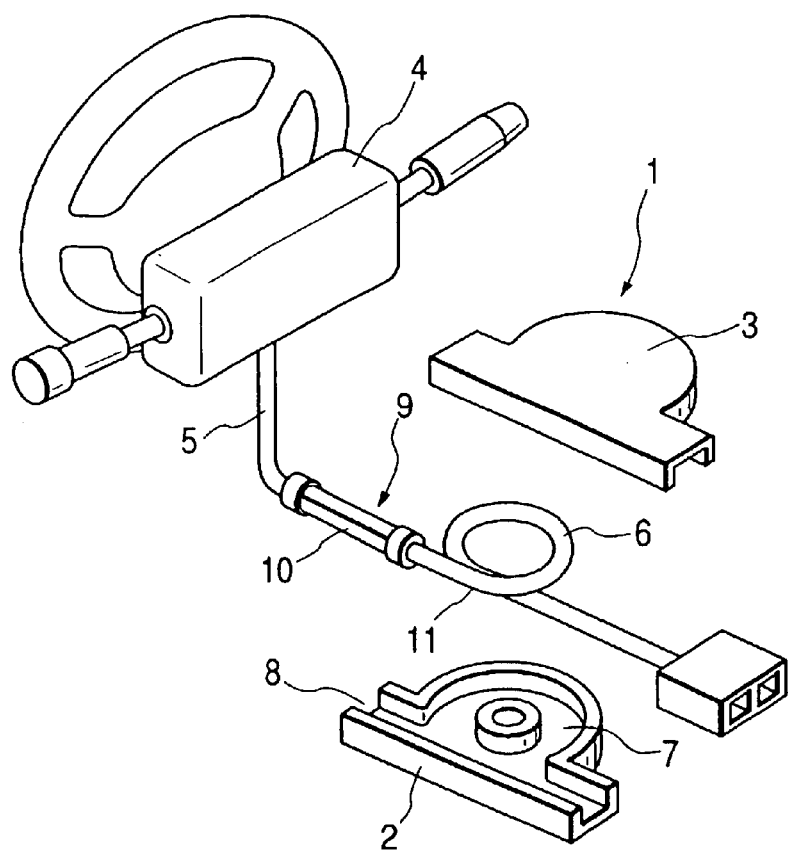
FIG. 7 is an exploded perspective view illustrating a conventional wire harness slack absorbing apparatus.
Figure 8A:
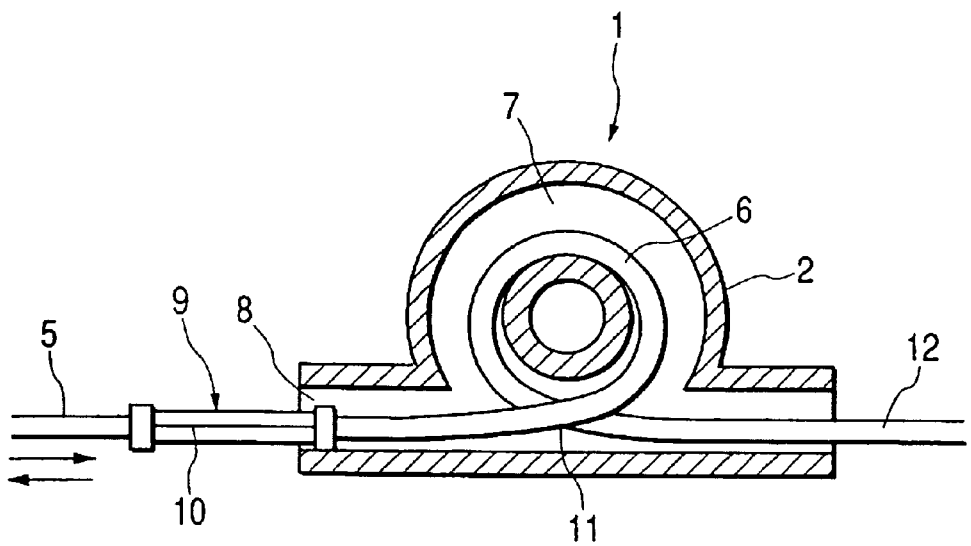
FIGS. 8A and 8B illustrate an action of the conventional wire harness slack absorbing apparatus.
Figure 8B:
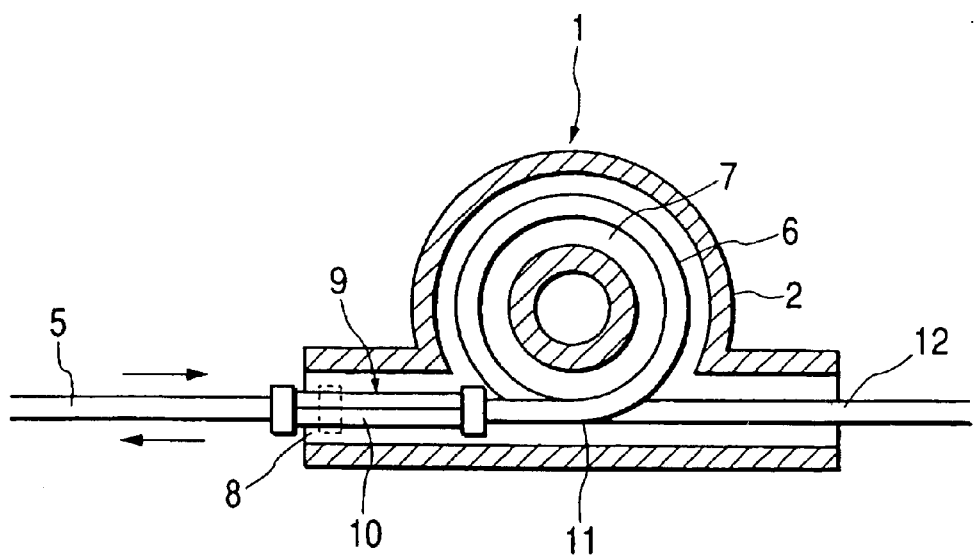

Further, a rigid wire part 9 (see FIG. 7), which the rigid cylinder 10 (see FIG. 7) is provided along and fixed to, similar to that provided in the conventional apparatus may be provided in the wire harness 22 (incidentally, such a rigid wire part is not limited to that having the shape and configuration employed in the conventional apparatus, as long as such a rigid wire part enhances the stiffness of the wire harness 22 and prevents an occurrence of buckling when the wire harness 22 is drawn into the slack-portion accommodating part.

As described above, the wire harness slack absorbing apparatus of the invention has the slack-portion accommodating part and the contact restraining part. When the slack portion is drawn out of or into the accommodating part, a distance is caused in the intersection part of the slack portion. Thus, the intersection part of the slack portion can be prevented from being abraded and caught in the accommodating part. Consequently, the durability of the wire harness can be enhanced. Furthermore, the drawing-out and drawing-in of the wire harness can be smoothly performed.

According to the wire harness slack absorbing apparatus of the invention, the position state of the slack potion of the contact part, with which the end portion of the contact restraining part comes in contact, can be held by the contact restraining part and the inner surface of the wall of the slack-portion accommodating part. Consequently, as compared with the conventional apparatus, the number of components and the number of man-hours can be decreased. Thus, the cost of the apparatus can be reduced.

According to the wire harness slack absorbing apparatus of the invention, the contact restraining part has elasticity. Thus, the sandwiched slack portion can be held without applying excessive side pressure thereto. Moreover, the workability of the apparatus can be enhanced.

According to the wire harness slack absorbing apparatus of the invention, the end portion of the contact restraining portion has the groove for preventing a contact part from slipping from the slack portion. Consequently, a distance is reliably caused between the segments of the intersection part of the slack portion. Thus, the durability of the wire harness can be enhanced still more.

According to the wire harness absorbing apparatus of the invention, the contact restraining part has a slope provided between the end portion and the base portion thereof. Thus, the looseness of the slack portion is restrained. Moreover, this can more reliably prevent occurrences of a phenomenon that the intersection part of the slack portion is abraded or caught in the slack-portion accommodating part.

What is claimed is:

1. A wire harness slack absorbing apparatus for wiring a wire harness between a main body and a moving body mounted on the main body so as to have at least a slack portion needed when the moving body is moved, the wire harness slack absorbing apparatus comprising:

a slack-portion accommodating part for accommodating the slack portion of the wire harness which is bent so as to have an annular shape in a plan view so that a diameter of the annular shape is freely increased and decreased; and a contact restraining part which is disposed on the slack-portion accommodating part and includes an end portion which comes in contact with the slack portion to provide a distance between cross-over segments of the slack portion that cross over each other when the slack portion is bent into the annular shape so that the cross-over segments do not touch each other.

2. The wire harness slack absorbing apparatus according to claim 1, wherein the slack portion is interposed between the end portion of the contact restraining part and an inner surface of a flat wall of a harness cover so as to hold the slack portion.

3. The wire harness slack absorbing apparatus according to claim 2, wherein the harness cover includes a first flat wall fitted to a side wall of a harness case, and an inclined wall continuously formed from the first flat wall, and the second flat wall continuously formed from the inclined wall and disposed at a place that is higher than the position of the first flat wall.

4. The wire harness slack absorbing apparatus according to claim 3, wherein the harness cover includes an outlet for which the wire harness can be moved.

5. The wire harness slack absorbing apparatus according to claim 1, wherein the contact restraining part has elasticity.

6. The wire harness slack absorbing apparatus according to claim 1, wherein the end portion of the contact restraining part has a groove for preventing the slack portion from slipping therefrom.

7. The wire harness slack absorbing apparatus according to claim 1, wherein the contact restraining part has a slope provided between the end portion of the contact restraining part and a base portion of a bottom wall of a harness case thereof opposite to the end portion.

8. The wire harness slack absorbing apparatus according to claim 7, wherein the bottom wall is formed in such a way as to be flat and has an area that is sufficient to allow the slack portion to increase the diameter thereof.

9. The wire harness slack absorbing apparatus according to claim 8, wherein the harness case includes a side wall.

10. The wire harness slack absorbing apparatus according to claim 9, wherein the harness case includes an outlet for which the wire harness can be moved.

11. The wire harness slack absorbing apparatus according to claim 1, wherein the distance between the cross-over segments is equal to or more than a diameter of the wire harness.

12. A wire harness slack absorbing apparatus for wiring a wire harness between a main body and a moving body disposed on the main body, the wire harness slack absorbing apparatus comprising:
    a harness cover; and
    a harness case, wherein the harness case comprising:
        a bottom wall, wherein the bottom wall includes a slack-portion accommodating part, the slack-portion accommodating part provides a space for a slack portion of the wire harness to have an annular shape in a plan view so that a diameter of the annular shape can increase and decrease; and
        a contact restraining part disposed on the slack-portion accommodating part, wherein the contact restraining part includes an end portion which comes in contact with the wire harness of annular shape and provides a distance between cross-over segments of the wire harness that are guided to cross over each other when the slack portion of the wire harness is bent into the annular shape so that the cross-over segments of the wire harness do not touch each other.

13. The wire harness slack absorbing apparatus according to claim 12, wherein the contact restraining part has a slope provided between the end portion and the bottom wall of the harness case.

14. The wire harness slack absorbing apparatus according to claim 13, wherein the end portion of the contact restraining part has a groove for preventing the slack portion of the wire harness from slipping therefrom.

15. The wire harness slack absorbing apparatus according to claim 13, wherein the harness cover further comprising:
    a first flat wall;
    a second flat wall, wherein the second flat wall is disposed at a position that is higher than a position of the first flat wall; and
    an inclined wall, wherein the inclined wall is formed between the first flat wall and the second flat wall.

16. The wire harness slack absorbing apparatus according to claim 15, wherein the inclined wall of the harness cover has a slope substantially the same as that of the slope of the contact restraining part.

17. The wire harness slack absorbing apparatus according to claim 15, the harness case further comprising a side wall that surrounds the perimeter of the bottom wall of the harness case, wherein the first wall of the harness case cover is disposed on a top portion of the side wall of the harness case.

18. The wire harness slack absorbing apparatus according to claim 17, wherein the second flat wall is substantially parallel to the bottom wall of the harness case, and wherein the slack portion of the wire harness is interposed between the end portion of the contact restraining part of the harness case and the inner surface of the second flat wall of the harness cover.

19. The wire harness slack absorbing apparatus according to claim 12, wherein the harness case further comprising an outlet for which the wire harness can be moved, and
    wherein the harness cover further comprising an outlet for which the wire harness can be moved.

20. The wire harness slack absorbing apparatus according to claim 12, wherein the distance between the cross-over segments is equal to or more than a diameter of the wire harness.

* * * * *